(12) United States Patent
Malone

(10) Patent No.: US 7,052,661 B1
(45) Date of Patent: May 30, 2006

(54) METHOD FOR ABATEMENT OF MERCURY EMISSIONS FROM COMBUSTION GASES

(75) Inventor: Donald P. Malone, Grayson, KY (US)

(73) Assignee: Envi Res LLC, Lexington, KY (US)

( * ) Notice: Subject to any disclaimer, the term of this patent is extended or adjusted under 35 U.S.C. 154(b) by 214 days.

(21) Appl. No.: 10/348,112

(22) Filed: Jan. 21, 2003

Related U.S. Application Data

(60) Provisional application No. 60/353,688, filed on Jan. 31, 2002, provisional application No. 60/432,423, filed on Dec. 11, 2002.

(51) Int. Cl.
- *C01G 11/00* (2006.01)
- *C01G 13/00* (2006.01)
- *C01G 9/00* (2006.01)
- *B01D 47/00* (2006.01)
- *B01J 8/00* (2006.01)

(52) U.S. Cl. ................ 423/210; 423/210.5; 423/99

(58) Field of Classification Search ........... 423/210, 423/210.5, 101–106, 107
See application file for complete search history.

(56) References Cited

U.S. PATENT DOCUMENTS

| | | | |
|---|---|---|---|
| 3,662,523 A | 5/1972 | Reyoir et al. | |
| 4,500,327 A | 2/1985 | Nishino et al. | |
| 4,602,574 A * | 7/1986 | Bach et al. | 588/314 |
| 5,177,304 A * | 1/1993 | Nagel | 588/314 |
| 5,191,154 A * | 3/1993 | Nagel | 588/314 |
| 5,202,100 A * | 4/1993 | Nagel et al. | 423/5 |
| 5,298,233 A * | 3/1994 | Nagel | 423/580.1 |
| 5,679,132 A * | 10/1997 | Rauenzahn et al. | 75/528 |
| 5,762,659 A * | 6/1998 | Katona et al. | 48/197 R |
| 5,984,985 A * | 11/1999 | Malone | 48/25 |
| 6,350,289 B1 | 2/2002 | Holcombe et al. | |
| 6,416,567 B1 | 7/2002 | Edlund et al. | |
| 6,808,692 B1 * | 10/2004 | Oehr | 423/210 |

* cited by examiner

*Primary Examiner*—Colleen P. Cooke
(74) *Attorney, Agent, or Firm*—Richard D. Stone

(57) ABSTRACT

A process for removing mercury from a feed of coal, heavy oil or other mercury contaminated material is disclosed. The feed is thermally decomposed, preferably within, or above, a molten metal bath under reducing conditions, to produce a vapor product and non-vapor decomposition products, such as carbon, which dissolve in the molten metal bath. Mercury, primarily in the form of elemental metal vapor, is removed with the vapor product, cooled and passed over a mercury adsorbent to recover mercury from the gas. The decomposition products are burned, e.g., by at least periodic oxidation of the molten metal bath. Preferably a HyMelt® reactor, with a bath of molten iron, operating at superatmospheric pressure, thermally decomposes the feed. The process permits efficient mercury removal and recovery from coal using conventional adsorbents, such as activated carbon.

9 Claims, 1 Drawing Sheet

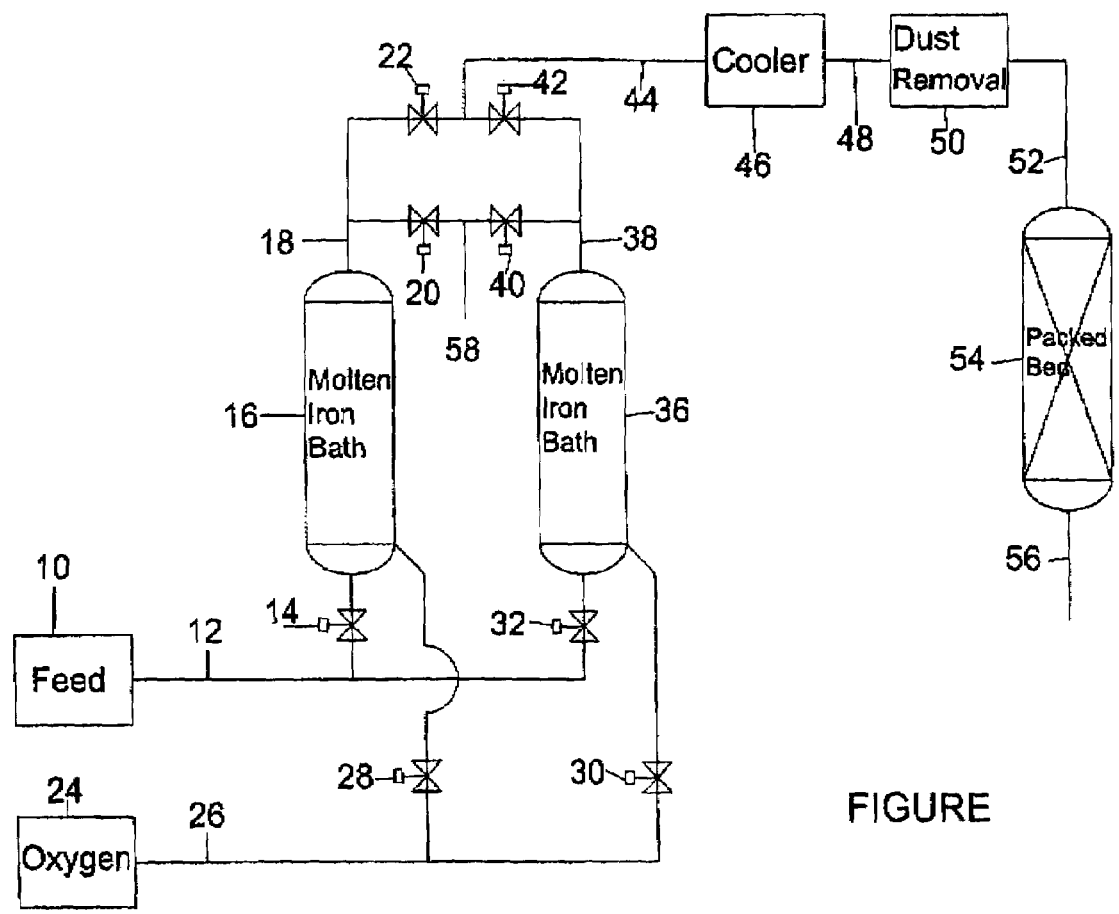
FIGURE

METHOD FOR ABATEMENT OF MERCURY EMISSIONS FROM COMBUSTION GASES

CROSS REFERENCES TO RELATED APPLICATIONS

This application claims the benefit of U.S. Provisional Applications No. 60/353,688 filed on Jan. 31, 2002 and No. 60/432,423 filed on Dec. 11, 2002.

U.S. Pat. No. 5,435,814, issued Jul. 25, 1995; U.S. Pat. No. 5,577,346, issued Nov. 26, 1996; U.S. Pat. No. 5,645,615, issued Jul. 8, 1997; U.S. Pat. No. 5,755,839, issued May 26, 1998; U.S. Pat. No. 5,984,985, issued Nov. 16, 1999; U.S. Pat. No. 6,110,239, issued Aug. 29, 2000; and U.S. Pat. No. 6,254,652B1, issued Jul. 3, 2001 all relate generally to the subject matter of the present invention and are incorporated by reference herein.

FIELD OF THE INVENTION

This invention relates to the abatement of mercury, cesium and/or selenium from gases and more particularly relates to the removal of such metals from gases produced by combustion or thermal processing of carbonaceous materials such as coal, heavy oil and the like and the incineration of municipal and medical waste.

BACKGROUND OF THE INVENTION

The Environmental Protection Agency ("EPA") is proposing regulations relating to the mercury content in emissions from coal-fired power plants. In December 2000, EPA announced that it would propose regulations by 2003 and issue final rules by 2004. The goal of the U.S. Department of Energy ("DOE") is to cut mercury emissions by 50 to 70 percent by 2005 and by 90 percent by 2010. The level of mercury in coal and the resultant flue gas from the burning of coal, such as in coal-fired plants, is so low that economical accurate analysis at this level was not possible until the last decade. However, the annual global release of mercury into the earth's atmosphere from all sources is estimated to be 5,000 tons per year of which 4,000 tons per year is estimated to occur as a result of human activities. The United States emissions of mercury from all sources are estimated to be 158 tons per year. Coal-fired power generation is the largest single contributor to U.S. mercury emissions at an estimated rate of 50 tons per year. The level of mercury in United States coal ranges from about 20 to about 300 parts per billion by weight (ppbw).

Mercury is the most volatile of all metals, having a normal boiling point of 642° F., well below the melting point of most metals. Mercury is conventionally associated with the inorganic fractions of the combustible material such as coal and is normally in the form of mercury oxide, HgO, mercury sulfide, HgS, mercury chloride, $HgCl_2$, and the like. In this form, coal washing typically removes as much as 30 percent of the mercury found in a normal run of mine coal thus leaving on the order of 70% of the mercury content in the coal. Coal combustion usually results in a flame temperature of at least 2,000° F., which dissociates all known mercury compounds to vaporized elemental mercury. The mercury is then carried in the flue gas and, unless otherwise treated, is released into the atmosphere. As the combustion gases cool, mercury may react with other components of the combustion gas to form mercury oxide, HgO, mercury sulfide, HgS, mercury chloride, $HgCl_2$, and the like. These compounds can be removed from flue gas more easily than elemental mercury because they desublime, that is they form a solid directly from vapor and can thus be removed with other particulate material. Assuming that during combustion all mercury found in coal does become elemental mercury in the flue gas, the typical vapor concentration of mercury is estimated to be 2.2 parts per billion (ppb) by volume. Although mercury is most targeted for removal from emission products, other trace metals, such as selenium and cadmium can also be present in the emissions produced by the combustion of carbonaceous materials and their emission can also be harmful to the environment.

Various methods have been proposed in the prior art for the abatement of mercury in flue gas emissions. For example, U.S. Pat. No. 5,435,980 issued Jul. 25, 1995 to Felsvang, et al. relates to a method for mercury abatement from coal-fired power plants flue gases using a spray drying absorption system employing the enhancement of the chloride content of the flue gas to form mercury chloride which can then be separated from the flue gas.

U.S. Pat. No. 5,607,496, issued Mar. 4, 1997, to Richard J. Brooks discloses a process in which the mercury of a hot combustion stream gas is oxidized to mercury oxide and then subsequently absorbed on particles that can be regenerated and reused by heating to decompose and drive off the mercury compounds. In one embodiment, the oxidation of the elemental mercury is catalytically promoted and the mercury compounds are removed from the gas stream by scrubbing.

U.S. Pat. No. 6,136,281, issued Oct. 24, 2000 to Meischen, et al. discloses a similar method for control of mercury emissions by the oxidation of elemental mercury in a flue gas stream prior to standard emissions control equipment. In its oxidized form, mercury can be more efficiently removed from flue gas streams by wet processes or by absorption or by wet processes. In one embodiment oxidation of the mercury takes place by the use of a porous bed of gold-coated material saturated with elemental mercury to the point that the gold in the presence of hydrochloric acid in the exhaust stream catalyzes the oxidation of elemental mercury.

U.S. Pat. No. 6,156,281, issued Dec. 5, 2000, to Akers, et al. relates to a process for removal of mercury and other trace elements from coal containing pyrite by forming a slurry of finely divided coal in a liquid solvent capable of forming ions or radicals having a tendency to react with constituents of pyrite or to attack the bond between pyrite and coal and/or to react with mercury to form mercury vapors. The slurry is heated in a closed container to a temperature of at least about 50° C. to produce vapors of the solvent and withdrawing vapors including solvent and mercury-containing vapors from the closed container then separating mercury from the vapors withdrawn, such as by treatment in a sulfuric acid bath to form mercury sulfide. This process is applied to the coal prior to its combustion.

U.S. Pat. No. 6,103,205 Wojtowicz, et al. relates to a process involving the regenerative absorption of mercury on activated carbons derived from scrap tires that inherently contain appreciable and desirable amounts of sulfur. This process also results in the concurrent control of $SO_2$ and NOx.

In European patent no. 0 253 563 a method for removal of mercury and other noxious compounds from incinerator flue gas is disclosed in which an aqueous liquid containing a basic absorbent is atomized into the flue gas to absorb acidic components from the flue gas and simultaneously to evaporate the water in said aqueous liquid, in which process powdery activated carbon is injected into the flue gas and separated again from said gas together with particulate material formed as a result of chemical reactions and drying of the atomized basic absorbent.

U.S. Pat. No. 3,662,523, Revoir et al., issued May 16, 1972 discloses that mercury removal from a gas is enhanced by passing the gas through a bed of carbon impregnated with halogen or inter-halogen compounds. The '523 process was primarily directed at small volumes of gas and/or high concentrations of mercury, with end use mentioned in the patent as " . . . on respirators to protect personnel against inhalation of mercury vapor or on large industrial processing equipment containing mercury to prevent contamination of the atmosphere with mercury vapor.

The "state of the art" seems to be directed to post-combustion treatment of the mercury in the flue gas from coal (or flue gas from other fuels which contain Hg, such as heavy oil and waste streams). Use of scrubbers or injecting chemicals such as halogens to change the chemical form of at least some of the mercury and improve capture efficiency in the scrubber or conventional adsorbent. Some approaches used an adsorbent with additives such as a halogen, found to improve Hg recovery. Some researchers even turned to a "gold plated" solution, using gold to form an amalgam with mercury and improve recovery.

These conventional approaches were expensive, because of the large volumes of gas to be treated and the low concentration of mercury and mercury compounds in the gas. Gas treatment was also complicated to some extent because the mercury would typically be in multiple oxidation states, ranging from elemental metal to some or all of it being in various oxidation states. Some work was done on injecting light hydrocarbon gas into flue gas to get more of the mercury in elemental form.

I wanted to have a more efficient way to remove mercury from, e.g., flue gas from burning of coal. I realized that conventional approaches to burning, e.g., oxidize the coal and release the at least partially oxidized mercury in an even more diluted form in the flue gas, just made mercury removal more difficult. The conventional approaches could be compared to using various scrubbers and/or adsorbents to remove SOx from flue gas. I realized it would be better to remove the sulfur prior to combustion, rather than after, because it is cheaper and more efficient. To have low sulfur emissions from burning gasoline, or fuel oil, it is much cheaper to remove the sulfur from the feed prior to combustion, rather than after.

Removing mercury from a feed stream is easier said than done. Conventional hydrotreating removes sulfur and may remove some mercury from a heavy oil feed, but this approach is not even an option with coal. I realized that another approach—thermal rather than catalytic—could be used to efficiently remove mercury from feedstocks and have the mercury in a relatively concentrated form, free of solids, and in the form of metal rather than an oxide. A thermal process which can be used to process coal, or any other feed with carbon, hydrogen and volatile metallic contaminant, has been developed by EnviRes, LLC, the HyMelt® process. HyMelt is ideal for severe thermal processing of coal, or other carbon, hydrogen and mercury containing feeds in that it separates high temperature thermal processing from oxidation. Thermal processing, in a relatively reducing atmosphere, provided the key step, which allowed mercury to be, in effect, "squeezed out" of a combustible chargestock, and permit its capture in a gas stream free of solids and condensable hydrocarbons. In addition to "squeezing out" the mercury, the high temperatures used thermally decompose the decomposable parts of the feed. In the case of a heavy hydrocarbon oil, used for the relative simplicity of its chemical composition, thermal decomposition produces large amounts of relatively pure hydrogen gas and solid carbon. The solid carbon dissolves in the molten metal bath while the hydrogen, with the vast majority of the mercury present in the feed heavy oil, is removed and recovered as a vapor phase product. Thermal decomposition creates reducing conditions which ensure that the mercury will be in the form of metal. Thermal decomposition or processing creates significant volumes of relatively clean gas, which carry the mercury away from the process. The large volumes of clean gas allow some heat recovery from this gas stream by indirect heat exchange without condensing the mercury.

Thermal processing, in the case of coal, reduces the volume of gas which has to be treated by at least 2 and typically by a factor of 5, or 10, or even 15 or more, as compared to the volume of flue gas produced when a like amount of coal is simply burned. Increasing the pressure of the thermal decomposition vapor stream is also possible, either by running the thermal processing step at superatmospheric pressure or by compressing the gas, usually after heat recovery, and charging the compressed gas to mercury recovery.

BRIEF SUMMARY OF THE INVENTION

Accordingly, the present invention a process for recovering mercury from a thermally decomposable feedstock containing mercury comprising thermally decomposing said feedstock by contact in or above a molten metal bath operating at thermal decomposition conditions including reducing conditions, a temperature above the boiling point of elemental mercury and a temperature sufficient to thermally decompose said feed to produce a thermal decomposition vapor stream comprising vaporized elemental mercury, cooling said thermal decomposition stream to produce a cooled thermal decomposition vapor stream, and recovering mercury from said cooled decomposition vapor stream by contact with a mercury recovery means.

In another embodiment, the present invention provides a process for removing and recovering mercury from coal containing mercury comprising thermally decomposing said coal by contact in or above a molten metal bath comprising iron operating at a temperature above 1000° C. to produce a vapor stream comprising vaporized elemental mercury and hydrogen produced by said thermal decomposition; cooling said vapor stream to produce a cooled vapor stream comprising elemental mercury and hydrogen; and adsorbing mercury directly from said cooled vapor, or from a gas stream produced by combusting or oxidizing said cooled vapor, followed by cooling, by contact with a mercury adsorbent.

While the following description of the preferred embodiments of this invention will be in conjunction with hydrogen rich and carbon monoxide rich streams produced by molten iron gasification, it will be understood that the present invention is applicable to any gasification process in which thermal gasification is used to form a separate hydrogen rich stream which may contain volatile metals.

The invention will be more fully understood from the following description of the preferred embodiment taken in conjunction with the figures.

BRIEF DESCRIPTION OF THE DRAWING

The FIGURE is a simplified schematic drawing of a preferred embodiment wherein mercury containing coal is converted to a hydrogen rich gas product containing vaporized elemental mercury which is subsequently removed by contact in a packed bed of activated carbon and a carbon monoxide rich gas.

DESCRIPTION OF PREFERRED EMBODIMENTS

In accordance with the present invention, two product streams are formed, a first hydrogen rich stream and a second carbon monoxide rich stream. The hydrogen rich stream may be used in various refinery or chemical processes or as a fuel. The carbon monoxide rich stream may be burned as fuel or used as a chemical feedstock to make alcohol or for other petrochemical use. As used herein the term carbonaceous material is any carbon containing material, which can be utilized to form the hydrogen rich stream and carbon monoxide rich stream and for the purposes of description herein will be coal.

In accordance with the invention, a mercury containing feedstock is fed into a molten iron bath which is maintained at sufficient temperature to keep the metal/feedstock composition liquid. The temperature is preferably between about 1150° C. to 1600° C. Preferably the molten metal bath is operated at super-atmospheric pressure, preferably between about 2–200 atmospheres. The higher pressures increase the rate at which the carbonaceous feedstock can be fed to the molten metal bath. The operation of such molten metal baths is well described in multiple prior patents, incorporated by reference herein. The present invention does not claim a new molten metal process, any known, or hereafter developed, molten metal bath can be used which is capable of producing two segregated gas product streams from one or more feed streams may be used.

Since the feedstock contains a substantial portion of hydrocarbon, a hydrogen off-gas is produced which is removed from the bath for subsequent processing and recovery of the hydrogen. A substantial portion of the vaporized mercury is contained in the hydrogen stream and, in accordance with the invention; the hydrogen stream is passed through a packed bed of activated carbon wherein the elemental mercury is adsorbed onto the carbon and is thus removed from the hydrogen stream. The packed carbon bed can be regenerated or in the alternative the spent carbon can be disposed of. While a packed carbon bed is preferred, any of the known adsorbents, or elemental mercury recovery methods used in the prior art may be used.

Referring to the FIGURE there is illustrated a simplified schematic diagram of the process for removing mercury in accordance with the present invention. A carbonaceous feedstock is fed from a source 10 through a line 12 to one of two molten iron baths 16 or 36. Valves 14 and 32 determine to which bath the carbonaceous feed goes. When feedstock flows to molten iron bath 16, valve 14 is open and valve 32 is closed, valve 20 is closed and valve 22 is open so that the hydrogen rich gas evolved flows into the hydrogen header 44. During this time oxygen from source 24 flows to molten iron vessel 36 by virtue of valve 28 being closed and valve 30 being open valve 42 is closed and valve 40 is open so that the carbon monoxide rich gas produced flows into the carbon monoxide header 58. Before the iron in bath 16 reaches carbon saturation, valves 14,32,28, 30 20, 22, 40 and 42 are all switched so that hydrogen rich gas is produced in molten iron bath 36 and carbon monoxide rich gas is produced in molten iron bath 16. The carbon monoxide produced in molten iron bath 16 still goes into the carbon monoxide header 58 and the hydrogen produced in molten iron bath 36 goes into the hydrogen header 44. The mercury component of the carbonaceous feedstock is vaporized into elemental mercury along with the production of a hydrogen rich stream in which the vaporized mercury is carried out of the bath 16 through a line 18 and through valve 22 into the hydrogen header 44. In a preferred embodiment, the hydrogen stream is passed through a cooling unit 46 of conventional design to bring the temperature of the hydrogen stream down to approximately 130° F. The hydrogen rich stream passes by line 48 to a dust removal system 50. Even at this temperature, however, the mercury does not condense and is not removed from the hydrogen stream. The hydrogen rich stream flows through line 52 to a packed bed, 54 where mercury adsorbs on activated carbon or some other suitable adsorbent, which preferably is otherwise untreated, where the mercury is adsorbed by the carbon. The mercury-free hydrogen stream 56 then passes on for subsequent processing. The molten bath 16 and the resultant hydrogen stream are preferably maintained under pressure. The mercury concentration is approximately 180 times higher than the mercury concentration of the conventional carbon injection systems operating on flue gas, at atmospheric pressure. These factors all contribute to increasing the efficiency of the adsorption by the activated carbon.

The carbonaceous feedstock may be coal or, a petroleum coke feedstock such as sponge coke from a delayed coker, shot coke, fines from fluid coker and the like. In addition, the feedstock may also comprise or consist essentially of, liquid hydrocarbons or crude petroleum.

The dissolved carbon is exothermically oxidized by contacting the bath with oxygen and is subsequently removed in the form of carbon oxides as a product of the process. Although most of the mercury exits the process in the hydrogen stream, some mercury may also be incorporated in the carbon oxide stream due to cross-contamination with the hydrogen stream in which some vaporized mercury will be picked up in the carbon stream. In accordance with the invention the carbon oxides stream can also be contacted with an adsorbent for removal of the mercury content thereof.

ILLUSTRATIVE EMBODIMENT

This Illustrative Embodiment is based on known properties of mercury and reasonable engineering estimates. It does not represent an actual laboratory experiment.

Vapor pressure data versus temperature for mercury are regressed into the Antoine equation given below:

$$\mathrm{Log}_{10} P^0{}_{Hg} = A - B/(C+t)$$

Where $P^0{}_{Hg}$ is the pure component vapor pressure for mercury in Torr

A, B and C are constants determined by least squares regression t is the temperature of the liquid and vapor in equilibrium in degrees C.

The following values are determined:
A=7.832950
B=−3066.849
C=265.21

Using the above-referenced average values for mercury in coal of 90 parts per billion by weight (ppbw) and a desired feed rate of 400 tons per day of coal, the amount of mercury released is found to be 0.072 lbs. per day (about one ounce per day). This results in a mercury concentration of 0.426 parts per million by volume (ppmv) in the hydrogen rich stream. Using a hydrogen stream temperature of 130° F. and a pressure of 500 psig, the partial pressure of mercury is found to be 0.011383 Torr. The saturation pressure for mercury at 130° F. is found to be 0.0173 Torr using the equation given above. Accordingly, under those conditions, no mercury will condense from the hydrogen stream although condensation would be expected to begin at a temperature of 123° F. This also means that mercury condensation would start for feed coal mercury values in the range of 100 ppbw and above.

A hydrogen rich gas stream is produced in accordance with the present invention as described above. The molten iron bath is maintained at a temperature of between about 1150° C. to about 1600° C. The feedstock is coal having a mercury content of about 90 ppbw. The hydrogen stream is cooled to a temperature of approximately 130° F. and is maintained at a pressure of 35 atmospheres. Under these conditions the volume of hydrogen gas to be treated is at least 1000 times less than the prior art carbon injection methods in which the total volume of the flue gas is treated. In addition, the concentration of the mercury is at least 180 times higher than in the flue gas treatment processes.

Phrased another way, the adsorbent capacity is increased, roughly proportionally, by an increase in pressure in the system. The adsorbent capacity is also increased, roughly proportionally, by an increase in concentration of the mercury. The increase in adsorbent capacity is the product of the two increases. In this coal illustration, the mercury concentration is increased by a factor of 180 as compared to the expected mercury concentration if conventional combustion had been used and the gas being treated was the combustion gas. For 30 atmosphere pressure operation, the capacity of the adsorbent is increased roughly 5,400 fold.

Based on prior art described above, the capacity of carbon for mercury has been calculated to be on the order of 50 parts of carbon to 1 part of mercury adsorbed. Utilizing a conservative value of 120 parts of carbon to 1 part of mercury, results in a packed volume of 105 feet cubed. Under these circumstances a packed bed with a diameter of 3 feet and packed height of 15 feet yields this volume. The average gas residence time in the packed bed is 37 seconds. The above described amount of activated carbon removes all of the mercury produced in a year (26.6 lbs.) with no regeneration. The installed cost of adding the activated carbon adsorption bed equipment is on the order of $100,000 per packed vessel. The annual cost of carbon at today's prices is less than $3,000.

The foregoing figures are based on the treatment of the hydrogen stream alone which results in the removal of about 95% of the mercury content of the feed stock. However, should even more stringent regulations be promulgated, the carbon oxide stream produced from the exothermic oxidation of the carbon in the molten bath 16 or 36 will remove approximately 99% of the mercury content of the feedstock. However, the cost of carbon and installation costs will be increased over those as set out above.

The present invention provides a method for the removal of mercury from carbonaceous feedstocks. In accordance with the invention nearly all of the mercury in the carbonaceous feedstock is picked up in the hydrogen rich stream produced from the molten bed. This stream represents 20%–25% of the total gas volume produced by the process. The packed bed can be regenerated to recover the elemental mercury and then can be reused. At worst, the exhausted carbon can be disposed of as a hazardous waste. In coal combustion plants with activated carbon injection, millions of pounds per year of spent carbon is produced which is contaminated with fly ash and thus cannot be regenerated by conventional means.

As mentioned above, the removal of certain metals such as mercury from the emission products produced by the combustion of coal is very difficult and can be expensive. For example utilization of entrained carbon particles in the fuel gas resulting from the combustion of coal can produce enormous amounts of exhausted carbon which cannot be regenerated and which may be difficult to dispose of. This cost has been estimated to arrange up to $70,000 per pound of mercury removal for conventional coal-fired systems. On the other hand, the method for abating mercury and similar metals is applied to processes in which the coal is converted into a carbon monoxide rich fuel with the production of a hydrogen rich stream at a first-year cost of about $870 per pound of mercury removed. This figure is arrived at assuming the use of a single packed, activated carbon bed. The bed would be regenerated once a year during a maintenance shutdown. The installed cost of the bed is estimated to be about $100,000. The relatively modest amount of carbon required is estimated to run about $3,000 per charge. Dividing these figures by an estimated mercury removal of 26.6 pounds per year produces the first-year cost of mercury removal utilizing the present invention. Subsequent years of operation will substantially reduce this cost as the initial installation costs are not reoccurring.

While the discussion above has centered on use of packed beds of carbon adsorbent, the present invention is not limited to such approaches. Any of the prior art mercury recovery methods used can be used herein to recover mercury metal from a hydrogen rich gas stream. Adsorbent can be injected into the flowing hydrogen rich gas stream, and such injected adsorbent will work well because the volume of gas to be treated will be reduced and the gas stream will be free of fly ash and other contaminants which would interfere with the injected adsorbent. Injected adsorbent particles will work better when the process operates at higher pressure. Similarly, a "gold plated" approach to mercury recovery may be used, with the hydrogen rich gas stream being passed over gold, or other metal or material which forms an amalgam with mercury. The invention may also be used with other approaches to mercury removal, with new adsorbents based on membranes, silica, chelating agents, doped adsorbents, wet scrubbing and the like.

When the molten metal bath operates at superatmospheric pressure, the mercury recovery operation is simplified and the use of hydrogen as a reagent or chemical feedstock is facilitated. When the molten metal bath operates at or near atmospheric pressure, fabrication cost of the molten metal bath is minimized, but such approach will produce low pressure hydrogen, which may have more value as fuel than feedstock.

Mercury adsorption works best at lower temperatures, typically ambient to 200° C. Much of the energy contained in the high temperature vapor stream from thermal decomposition can be recovered by heat exchange, although preferably the temperature of the vapor stream remains sufficiently to prevent the condensation of liquid mercury or solid reaction products of mercury with other contaminants present in the feed. This ensures that most, and preferably all, of the mercury removal occurs on the mercury adsorbent, ensuring that the heat exchange equipment will not be fouled.

Although the cost of mercury recover using thermal decomposition is one to several orders of magnitude more efficient as compared to the cost of mercury recovery using conventional approaches, the cost of the molten metal facility and modifications required in downstream units must also be considered. In, e.g., older power plants burning coal, it may be cost effective to use a HyMelt plant to process the highest mercury content coal, or coal washings which contain a high mercury content. In this hypothetical, the hydrogen rich stream could be processed for mercury recovery, via adsorption, and the resulting hydrogen rich stream mixed with a CO rich stream produced in the HyMelt unit, and this mixture burned in the coal boiler as part or, or complete replacement for, solid coal or heavy oil previously added. When HyMelt is used to process all the coal, it may be possible to shut down or eliminate some parts of the old power plant, e.g., the HyMelt plant may be operated to remove sufficient Sulfur from the coal to eliminate a Sox scrubber and/or a bag house or electrostatic precipitator may be eliminated, as the gaseous streams from a HyMelt plant can be essentially free of particulates.

Optimum use of this mercury removal technology for, e.g., coal burning, may be complete elimination of the conventional coal burning equipment. The HyMelt process is used to create two clean gas streams, a hydrogen rich gas from which the mercury can be removed using the process and apparatus of the present invention, and a carbon oxides rich gas. Both of these streams can be used as a heat source, to generate steam via heat exchange, and as fuel gas for turbines.

While the process has been discussed primarily in conjunction with feeds of coal and/or heavy oil, it will also find application for processing of medical waste and certain industrial waste materials which contain mercury. Some of these feeds may contain relatively large amounts of mercury and relatively low amounts of carbon. It may be beneficial, for heat balance and to ensure that a sufficient volume of gas is generated to transport the vaporized, elemental mercury from the molten metal reactor, to add some coal, heavy oil, or the like. The process may also be used to treat relatively clean, normally gaseous feeds such as natural gas containing mercury.

Although the discussion above focused on use of thermal processing in a reducing environment to remove mercury in its elemental metal state in a reducing gas stream, with subsequent capture of elemental mercury on an adsorbent, local conditions may favor additional steps intermediate the thermal reactor and the absorber. The gas stream with mercury vapor has significant fuel value and may be burned in a furnace, or used to fire a turbine. This combustion step can be used to convert most of the mercury to the oxidized form, which is more easily captured by existing adsorbents and/or scrubbers. This approach permits use of existing equipment which may be optimized for capture of mercury oxides, e.g., a coal fired plant has a wet scrubber, or other facility which can recover mercury in an oxidized form or some other species which can not be created in a reducing atmosphere. Preferably the reducing gas stream from the HyMelt reactor is oxidized, burned or otherwise handled separately from the carbon oxides stream from the HyMelt reactor, so that the mercury can be removed from the stream in which it is present and concentrated.

Although many types of thermal reactors can be used to thermally decompose, without burning, the feedstock, use of a HyMelt molten metal reactor is preferred. The process and approach disclosed in U.S. Pat. No. 6,350,289, Two-zone molten metal hydrogen-rich and carbon monoxide-rich gas generation process, is preferred and is incorporated by reference.

The invention claimed is:

1. A process for removing and recovering mercury from a feedstock which contains mercury and/or mercury compounds and which is at least partially combustible under oxidizing conditions and at least partially thermally decomposable under reducing conditions into vapor and non-vapor fractions comprising:
   a. thermally decomposing in a thermal reactor at least a portion of said feedstock by heating it to a temperature above 1000° C. under reducing conditions to produce a vapor stream comprising at least a majority of said mercury and/or mercury compounds present in said feedstock and thermal decomposition vapor products and a non-vapor fraction
   b. separating in said thermal reactor said vapor stream from said non-vapor fraction and discharging said vapor stream from said thermal reactor
   c. cooling said vapor stream to produce a cooled vapor stream comprising elemental mercury
   d. recovering mercury directly from said cooled vapor, or from a gas stream produced by combusting or oxidizing said cooled vapor, followed by cooling, by contact with a mercury adsorbent and
   e. combusting, at least intermittently, said non-vapor fraction to produce an oxidized flue gas with a reduced content of mercury and/or mercury compounds as compared to an oxidized flue gas prepared by combustion of said feedstock.

2. The process of claim 1 wherein said feedstock comprises hydrogen and carbon, thermal decomposition produces elemental hydrogen gas which is removed as part of said thermal decomposition stream and elemental carbon which dissolves in said molten metal bath, and wherein said molten metal bath is at least periodically, or continuously, oxidized to produce a carbon oxides vapor stream.

3. The process of claim 1 wherein said mercury adsorbent comprises a fixed, fluidized, or entrained bed of activated carbon.

4. The process of claim 1 wherein said process operates at super-atmospheric pressure.

5. The process of claim 1 wherein said process operates at 2 to 20 atmospheres, absolute.

6. The process of claim 1 wherein a majority of said mercury is recovered as elemental mercury on an adsorbent.

7. The process of claim 1 wherein said adsorbent is activated carbon.

8. The process of claim 1 wherein adsorbent is a fixed, expanded, ebullating, or moving bed or is entrained in said cooled vapor stream.

9. The process of claim 1 wherein said feedstock is thermally decomposed by heating by direct contact in or above a molten metal bath comprising molten iron.

* * * * *